(12) United States Patent
Lee et al.

(10) Patent No.: US 6,233,407 B1
(45) Date of Patent: May 15, 2001

(54) CAMERA WITH MAGNETIC ROLLER RECORDER FOR REPETITIVELY RECORDING INFORMATION ALONG MAGNETIC TRACK ON FILMSTRIP

(75) Inventors: James Kelly Lee, Rochester, NY (US); Frederick John Jeffers, Escondido, CA (US)

(73) Assignee: Eastman Kodak Company, Rochester, NY (US)

( * ) Notice: Subject to any disclaimer, the term of this patent is extended or adjusted under 35 U.S.C. 154(b) by 373 days.

(21) Appl. No.: 08/698,707

(22) Filed: Aug. 16, 1996

Related U.S. Application Data

(60) Provisional application No. 60/006,969, filed on Nov. 20, 1995.

(51) Int. Cl.[7] .................................................. G03B 17/24
(52) U.S. Cl. ............................................................ 396/319
(58) Field of Search .................................. 360/1, 2, 3, 15, 360/16, 17; 396/319, 320; 354/105, 100

(56) References Cited

U.S. PATENT DOCUMENTS

| | | | |
|---|---|---|---|
| 3,693,182 | 9/1972 | Smith | 346/74 M |
| 3,699,269 | * 10/1972 | Smaller | 360/16 |
| 3,995,313 | 11/1976 | Fayling | 360/15 |
| 4,110,797 | * 8/1978 | Hoshino et al. | 360/17 |
| 4,379,276 | 4/1983 | Bouchara et al. | 335/284 |
| 4,678,299 | 7/1987 | Harvey | 354/21 |
| 4,933,780 | 6/1990 | Wash et al. | 360/1 |
| 5,130,745 | 7/1992 | Cloutier et al. | 355/40 |
| 5,218,493 | 6/1993 | Jeffers | 360/100.1 |
| 5,276,470 | 1/1994 | Fridman | 354/106 |
| 5,307,100 | 4/1994 | Kubo | 354/105 |
| 5,353,169 | 10/1994 | Jeffers et al. | 360/16 |
| 5,519,464 | * 5/1996 | Brock et al. | 396/319 |
| 5,543,872 | * 8/1996 | Goto et al. | 396/319 |
| 5,572,267 | * 11/1996 | Swanson et al. | 396/319 |

* cited by examiner

*Primary Examiner*—David M. Gray
(74) *Attorney, Agent, or Firm*—Roger A. Fields

(57) ABSTRACT

A camera comprises an information-bearing medium movable to record predetermined information on a filmstrip. The information-bearing medium is a magnetic roller recorder on which is magnetically stored the information, and which is rotationally supported in place for stationary rolling contact with a magnetic track on a filmstrip as the filmstrip is advanced, whereby the information can be repetitively recorded along the magnetic track on the filmstrip. The magnetic roller recorder can be provided apart from the camera as an owner-personalization accessory for the camera.

4 Claims, 2 Drawing Sheets

CAMERA WITH MAGNETIC ROLLER RECORDER FOR REPETITIVELY RECORDING INFORMATION ALONG MAGNETIC TRACK ON FILMSTRIP

CROSS-REFERENCE TO RELATED APPLICATIONS

Reference is made to and priority claimed in U.S. Provisional Application Ser. No. U.S. 60/006,969, filed Nov. 20, 1995, entitled CAMERA WITH MAGNETIC ROLLER RECORDED FOR REPETITIVELY RECORDING INFORMATION ALONG MAGNETIC TRACK ON FILMSTRIP.

Reference is made to commonly assigned copending applications Ser. No. 08/346,722, entitled VERY HIGH FIELD MAGNETIC ROLLER RECORDER and filed Nov. 30, 1994 in the name of Frederick J. Jeffers, and Ser. No. 08/370,720, entitled VERY HIGH FIELD MICRO MAGNETIC ROLLER AND METHOD OF MAKING SAME and filed Jan. 10, 1995 in the name of Frederick J. Jeffers, J. Kelly Lee and Svetlana Reznik.

The two cross-referenced applications are incorporated in this application.

FIELD OF THE INVENTION

The invention relates generally to the field of photography, and in particular to cameras in which predetermined information is to be recorded in or adjacent each exposed frame of a filmstrip. More specifically, the invention relates to a camera with a magnetic roller recorder for repetitively recording owner-personalization information along a magnetic track on the filmstrip. The magnetic roller recorder can be provided apart from the camera as an owner-personalization accessory for the camera.

BACKGROUND OF THE INVENTION

Prior art U.S. Pat. No. 5,276,470, issued Jan. 4, 1994 discloses a symbol film-imprinting mechanism for cameras. The mechanism fits onto the rear door of a camera and comprises an endless belt-like tape supported on a pair of spaced rollers for rotation to move selected information, such as the date, the time, or the exposure number, into position to expose the information on the filmstrip when a picture is taken. A bulb and an associated mirror are provided for supplying the light to expose the information on the filmstrip. The endless belt, the tape and the mirror significantly increase the size and the manufacturing cost of the camera.

THE CROSS-REFERENCED APPLICATIONS

Cross-referenced application Ser. No. 08/346,722 [our Docket No. 68494WFN] discloses a very high field magnetic roller recorder for recording information on a slave medium when the roller recorder is rolled along the slave medium. The magnetic roller recorder comprises a series of high energy bar magnets mounted around the circumference of a non-magnetic cylinder.

Each magnet's direction of magnetization is perpendicular to the plane of the slave medium when the magnet is in full contact with the slave medium. Moreover, the direction of magnetization alternates 180 degrees from magnet to magnet. As a result, a periodic repetitive pattern of information can be recorded on the slave medium as the roller recorder is rolled along the slave medium.

Cross-referenced application Ser. No. 08/370,720 [our Docket No. 70345WFN] discloses a very high field magnetic micro-roller recorder for recording information on a slave medium when the micro-roller recorder is rolled along the slave medium. Rather than mounting discrete magnets around the circumference of a non-magnetic cylinder as in cross-referenced application Ser. No. 08/346,722 [our Docket No. 68494WFN], the cylinder is constructed of a high energy magnetic material magnetized to saturation in a predetermined pattern of circumferentially located poles.

SUMMARY OF THE INVENTION

According to one aspect of the invention, a camera comprising an information-bearing medium movable to record predetermined information on a filmstrip, is characterized in that:

the information-bearing medium is a magnetic roller recorder having a roller periphery on which is magnetically stored the information, such as the name and/or address of the owner of the camera, and which is rotationally supported in place for stationary rolling contact of the roller periphery with a magnetic track on a filmstrip as the filmstrip is advanced, whereby the information can be repetitively recorded along the magnetic track on the filmstrip.

According to another aspect of the invention, a personalization accessory for a camera, comprises:

a magnetic roller recorder having a roller periphery on which is magnetically stored owner-personalization information; and a plate configured to be fitted at a rear opening in the camera that is opposite a magnetic track on a filmstrip in the camera, to light-tightly seal the rear opening, and rotationally supporting the magnetic roller recorder through the rear opening for the roller periphery to be in stationary rolling contact with the magnetic track as the filmstrip is advanced, whereby the information can be repetitively recorded along the magnetic track.

Preferably, in either instance, the information stored on the roller periphery constitutes a series of continuously-repeating complete identical messages. The identical messages occupy successive peripheral spaces along the roller periphery which are sufficiently short to ensure that at least one of the identical messages will be recorded on the magnetic track for each exposed frame of the filmstrip. Thus, respective prints corresponding to the exposed frames can all include at least one visible representation of the identical messages.

Also, the plate can include an imprint of the name and/or address of the owner of the camera.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
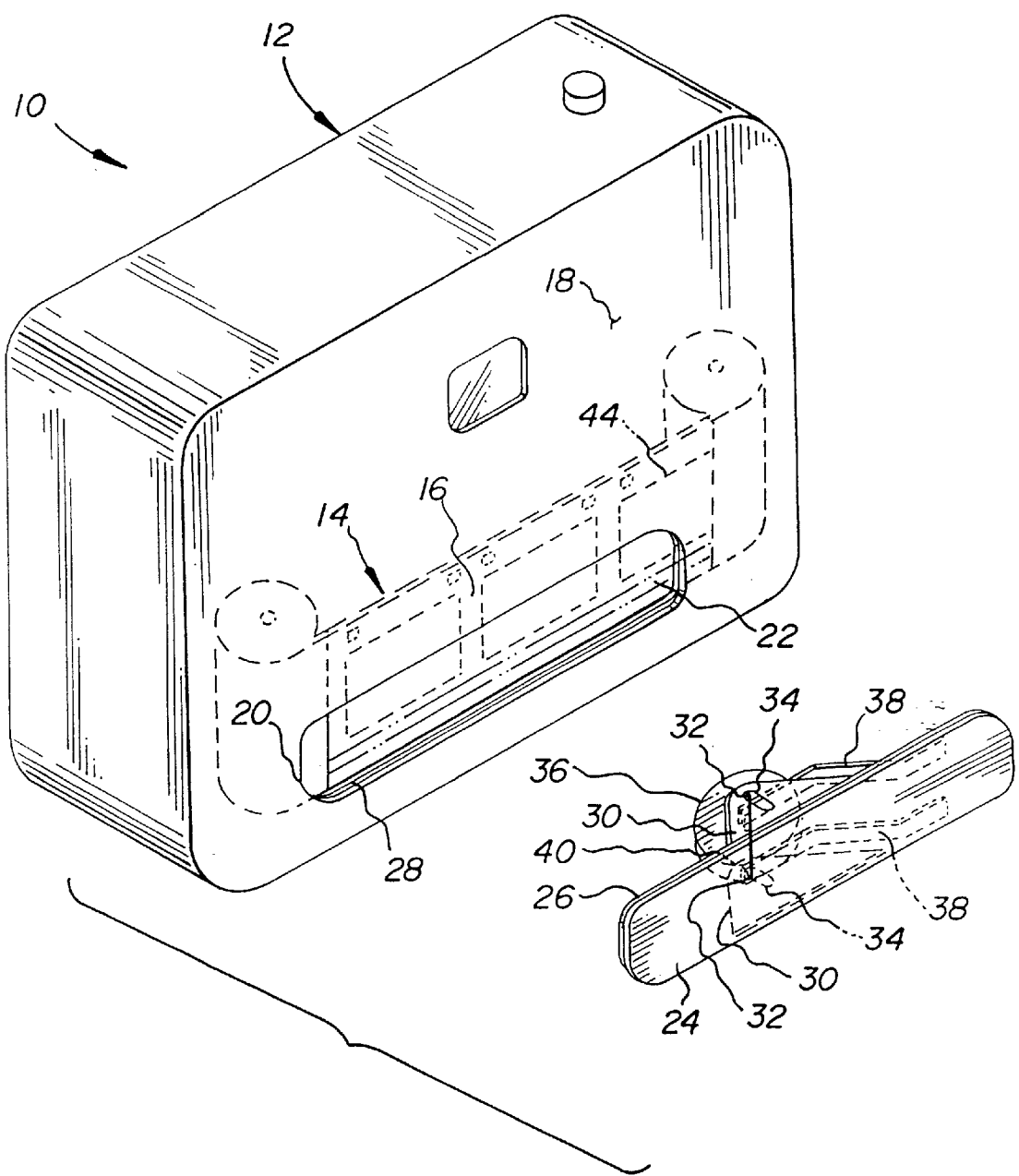
FIG. 1 is an exploded perspective view of a camera and an owner-personalization accessory, including a magnetic roller recorder, according to a preferred embodiment of the invention.

Referring now to the drawings, FIG. 1 shows a camera 10 comprising a housing 12 in which successive frames of a filmstrip 14 are exposed during picture-taking. The filmstrip 14 is the type disclosed in prior art U.S. Pat. No. 5,130,745, issued Jul. 14, 1992, as having a virtually transparent magnetic coating 16 on the non-emulsion side of the filmstrip.

As shown in FIG. 1, a rear portion 18 of the housing 12 has a rear opening 20 which provides access to a magnetic track 22 along the magnetic coating 16 on the non-emulsion side of the filmstrip 14. The magnetic track 22 is located adjacent each exposed frame of the filmstrip 14.

A name-plate 24 adapted to snugly fit in the rear opening 20 has a peripheral edge tongue 26 that mates with a peripheral edge groove 28 of the rear opening to light-tightly seal the rear opening when the name-plate is received in the rear opening. A pair of parallel extensions or brackets 30, 30 of the name-plate 24 carry respective coaxial pin ends 32, 32 in separate slots 34, 34 in the extensions to rotatably support a magnetic roller recorder 36. A pair of end-springs 38, 38 lightly urge the magnetic roller recorder 36 away from the name-plate 24.

The magnetic roller recorder 36 can be of the type disclosed in either one of the cross-referenced applications (which are incorporated in this application). Preferably, the magnetic roller recorder 36 is made from a high energy magnetic material such as isotropic neodymium-iron-boron or radially oriented strontium-ferrite. Both of these magnetic materials are capable of producing magnetic fields at a short distance from a roller periphery 40 of the magnetic roller recorder 36 that are in excess of the coercivity of the magnetic coating 16 on the non-emulsion side of the filmstrip 14.

As shown in FIG. 1, the magnetic roller recorder 36 is small enough to be inserted through the rear opening 20 to be spring-urged into intimate peripheral contact with the magnetic track 22 when the name-plate 24 is secured in the rear opening. Then, when the filmstrip 14 is advanced for picture-taking in the housing 12, the magnetic roller recorder 36 will be rotated in place and the roller periphery 40 will be in stationary rolling contact with the magnetic track 22.

Figure 2:
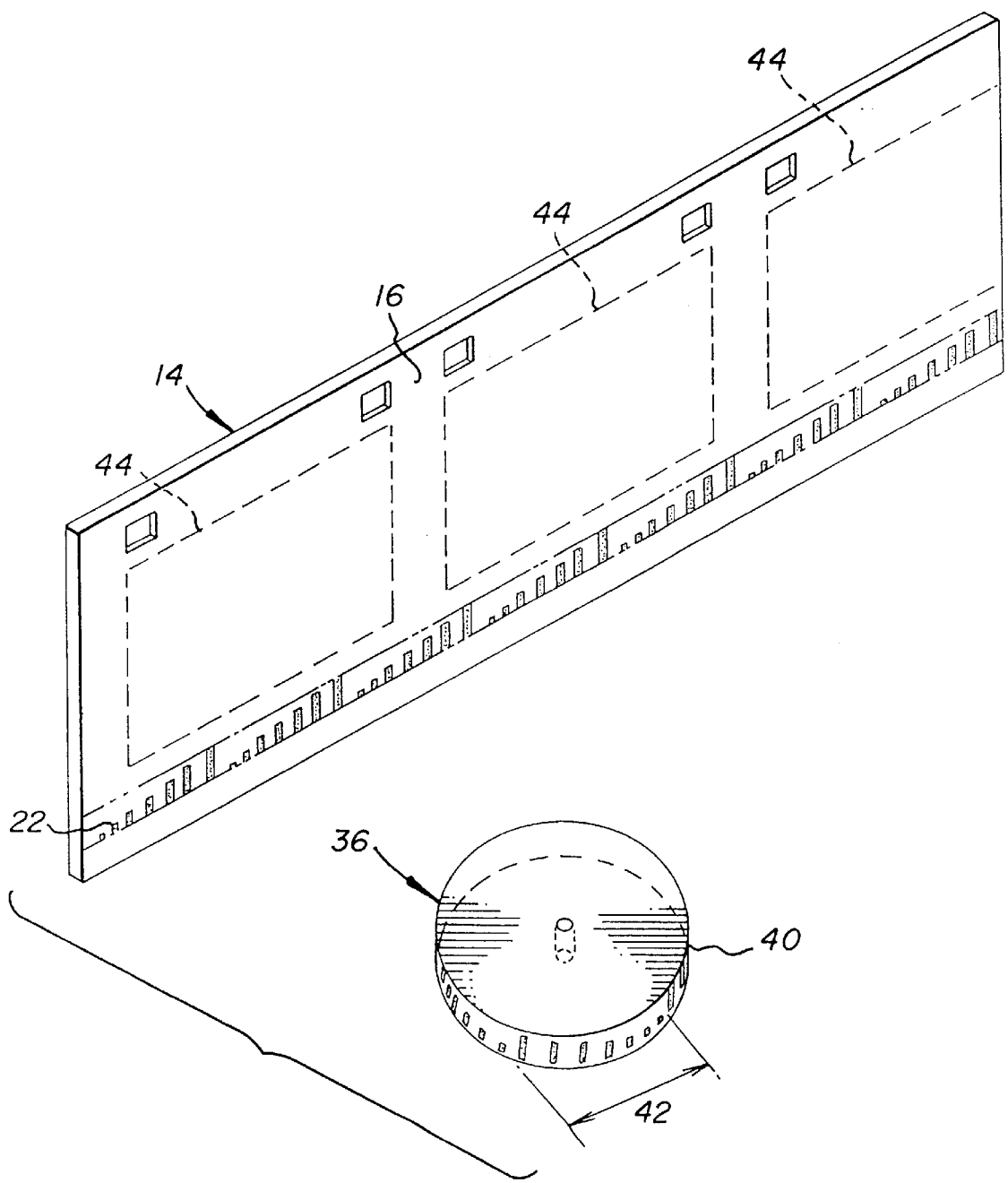
FIG. 2 is a perspective view of a filmstrip and the magnetic roller recorder.

Generally speaking, repeated instances of the same information are magnetically stored continuously along the roller periphery 40. That is, the information magnetically stored on the roller periphery 40 constitutes an endless series of complete identical messages. When the filmstrip 14 is advanced for picture-taking in the housing 12, the message will be repetitively recorded (without any gaps) along the magnetic track 22. As depicted in FIG. 2, each instance of the information magnetically stored on the roller periphery 40 occupies a peripheral space 42 which is sufficiently short to ensure that at least one instance of the information will be recorded on the magnetic track 22 adjacent each exposed frame 44 of the filmstrip 14. Alternatively, the diameter of the magnetic roller recorder 36 can be made small enough to accomplish the same purpose. Thus, respective prints corresponding to the exposed frames can all include the message.

Preferably, each instance of the information magnetically recorded on the roller periphery 40 is a magnetic representation of the name, e.g. "John Doe", of the owner of the camera 10. Also, "John Doe" is imprinted on the name-plate 24. See FIG. 1. Of course, additional information can be included.

The magnetic roller recorder 36 and the name-plate 24 can be provided apart from the camera 10 as an owner-personalization accessory for the camera.

The invention has been described with reference to a preferred embodiment. However, it will be appreciated that variations and modifications can be effected by a person of ordinary skill in the art without departing from the scope of the invention. For example, a flexible light baffle can be provided inside the rear opening 20 in place of the name-plate 24

PARTS LIST 10. camera
12. housing
14. filmstrip
16. magnetic coating
18. rear portion
20. rear opening
22. magnetic track
24. name-plate
26. peripheral edge tongue
28. peripheral edge groove
30, 30. extensions
32, 32. pins ends
34, 34. slots
36. magnetic roller recorder
38, 38. end-springs
40. roller periphery
42. peripheral space
44. exposed frame

What is claimed is:

1. A camera comprising an information-bearing medium movable to record non-varying information on a filmstrip, is characterized in that:

said information-bearing medium is a magnetic roller recorder having a roller periphery on which is magnetically stored the non-varying information;

a rear housing portion has a rear opening that is opposite a magnetic track on a filmstrip and is of sufficient size for said magnetic roller recorder to be inserted at least part way trough said rear opening into said camera to locate said roller periphery in stationary rolling contact with the magnetic track as the filmstrip is advanced; and means rotationally supports said roller recorder in place for stationary rolling contact of said roller periphery with a magnetic track on a filmstrip as the filmstrip is advanced, in order that the non-varying information can be repetitively recorded along the magnetic track on the filmstrip, and includes a plate which rotationally supports said magnetic roller recorder in place and is constructed to be fitted to said rear housing portion to light-tightly seal said rear opening and to be removable completely from the camera to separate the roller recorder from the filmstrip without breaking the camera.

2. A camera as recited in claim 1, wherein said plate includes a visible readable manifestation of the non-varying information magnetically stored on said roller periphery.

3. A camera as recited in claim 1, wherein the non-varying information magnetically stored on said roller periphery constitutes a series of continuously-repeating complete identical messages.

4. A camera as recited in claim 3, wherein the complete identical messages that constitute the non-varying information magnetically stored on said roller periphery occupy successive peripheral spaces along the roller periphery which are sufficiently short to ensure that at least one of the identical messages will be recorded on the magnetic track for each exposed frame of the filmstrip.

* * * * *